McLean & Gummer,
Making Laths.

N° 28,883.　　　Patented June 26, 1860.

Witnesses
William Findley
Edwin May

Inventor.
James W. McLean
Albert Gummer

UNITED STATES PATENT OFFICE.

JAMES W. McLEAN AND A. GUMMER, OF INDIANAPOLIS, INDIANA.

LATH-MACHINE.

Specification of Letters Patent No. 28,883, dated June 26, 1860.

*To all whom it may concern:*

Be it known that we, JAMES W. McLEAN and ALBERT GUMMER, of Indianapolis, in the county of Marion and State of Indiana, have invented a new and useful Improvement in Lath-Machines; and we do hereby declare that the following is a clear and exact description of the construction and operation of the same, reference being had to the annexed drawings making a part of this specification, in which—

Figure 1:
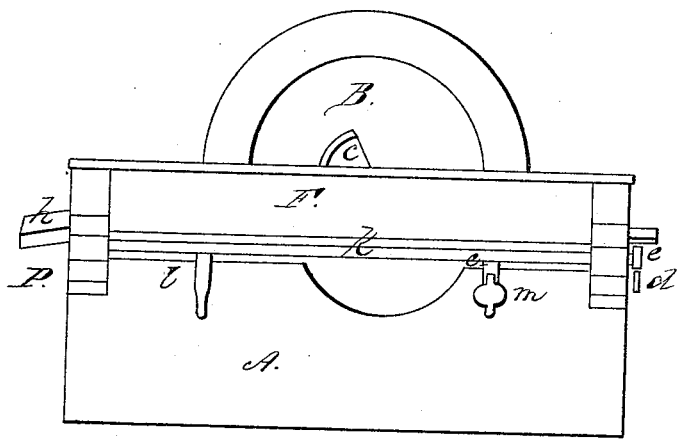
Figure 2:
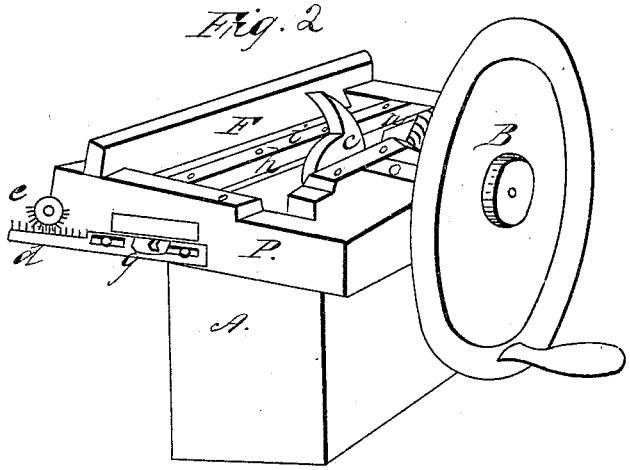

Figure 2 is a perspective view and Fig. 1 a longitudinal elevation.

The nature of our invention consists in using a spiral cam for propelling the knife which moves forward and back at an angle of about forty-five degrees. By the peculiar construction of this cam the knife after having made its cut is brought back instantaneously by means of a spiral spring being attached to the knife plate, and the frame work, thus giving it the entire surface of the cam and a gradual wedge motion to make the cut of the lath. Also in an entire new way for supporting the lath board before the lath is cut and relieving the same in the act of cutting. By this device the cutting of the lath is accomplished with an ease never obtained by any previous machine, for at the instant the edge of the knife comes in contact with the lath board its supporters drop from a horizontal position to a vertical one. Consequently it allows no stress or pinching whatever between the knife and the supporters of the lath board.

To enable others skilled in the art to make and use our invention we will proceed to describe its construction and operation.

We construct our machine with a rectangular frame as shown at (P, P), and which is bolted on the supposed log (A, A). (C, C) is a spiral cam fastened on the shaft (O), Fig. 2, and by turning the fly wheel (B, B) it drives the knife plate (h h) diagonally forward until it has cut the required lath, when it instantly returns by means of the spiral spring (n) Fig. 2.

(F, F) is the breast piece against which the lath board is placed to resist the force of the knife (i) Fig. 2.

(g, Fig. 2,) is an angular slot into which works a pin fastened in the end of the knife plate (h, h) which when passing down to cut the lath forces the rack (d, d) forward and the rack (d, d) passing out revolves the section of wheel (e, e) fastened on the end of the supporting rod (k, Fig. 1,) and by the time the knife plate (h, h) has completed its full stroke the two supporters (l, l) Fig. 1, attached to the rod (k) Fig. 1, have attained a perpendicular position to relieve the lath, and the knife plate (h, h) returning they then resume again their horizontal position.

(m) Fig. 1 is a set-screw designed to regulate the two supporters (l, l) Fig. 1 so as to cut either a thick or thin lath.

What we claim as being new and desire to secure by Letters Patent is—

The rack (d, d) the angular slot (g) Fig. 2, the section of wheel (e, e) or their equivalents in connection with the rod (k) Fig. 1 the two supporters (l, l) and the set-screw (m), substantially as and for the purpose set forth.

JAMES W. McLEAN.
ALBERT GUMMER.

Witnesses:
WILLIAM FINDLEY,
EDWIN MAY.